United States Patent Office 3,492,406
Patented Jan. 27, 1970

3,492,406
PHARMACEUTICAL COMPOSITION CONTAINING 3-(2 - FLUOROPHENYL) - 1,2,3 - BENZOTRIAZIN-4-ONE AND A METHOD OF PRODUCING ANORETIC ACTIVITY WITH SUCH
Gerhard Satzinger, Gundelfingen, Freiburg, Germany, assignor to Warner-Lambert Pharmaceutical Company, Morris Plains, N.J., a corporation of Delaware
No Drawing. Original application Sept. 11, 1967, Ser. No. 666,955. Divided and this application Sept. 5, 1968, Ser. No. 757,769
Int. Cl. A61k 27/00
U.S. Cl. 424—249    2 Claims

ABSTRACT OF THE DISCLOSURE

This invention relates to a pharmaceutical composition containing 3-(2-fluorophenyl)-1,2,3-benzotriazin - 4-one of the formula:

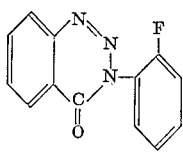

which is useful as an anoretic agent in the mammalian body.

Cross reference

This application is a divisional application of my co-pending application Ser. No. 666,955, filed Sept. 11, 1967.

Summary of the invention

This invention relates to a pharmaceutical composition comprising (a) 3-(2-fluorophenyl)-1,2,3 - benzotriazin-4-one having the formula:

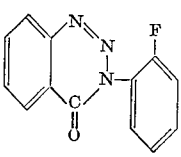

and (b) a pharmaceutical excipient material; and to methods of producing anorexia in the mammalian body.

Description of the preferred embodiments

The present invention relates to pharmaceutical compositions containing 3-(2-fluorophenyl)-1,2,3 - benzotriazin-4-one having the formula:

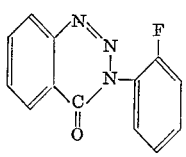

and to methods of producing anorexia in the mammalian body.

This compound exhibits unusual pharmacological properties. As will be discussed in more detail later, this systemically extremely well-tolerated compound is distinguished by its outstanding anoretic-antisecretory activity in the mammalian body. Since this substance also has a sedative effect on the central nervous system, it compares very favorably with all known anoretic agents, which are generally recognized as producing, in addition to their anoretic effect, a most undesirable stimulation of the central nervous system.

The novel compounds of this invention can be obtained by an adaptation of the process disclosed in the following publications: J. Org. Chem. 9,55 (1944); Compt. rend. 243, 2094 (1956), J. Org. Chem. 26,613 (1961); 27, 1383 (1962); J. Pract. Chem. (2) (1963), according to the following reaction scheme:

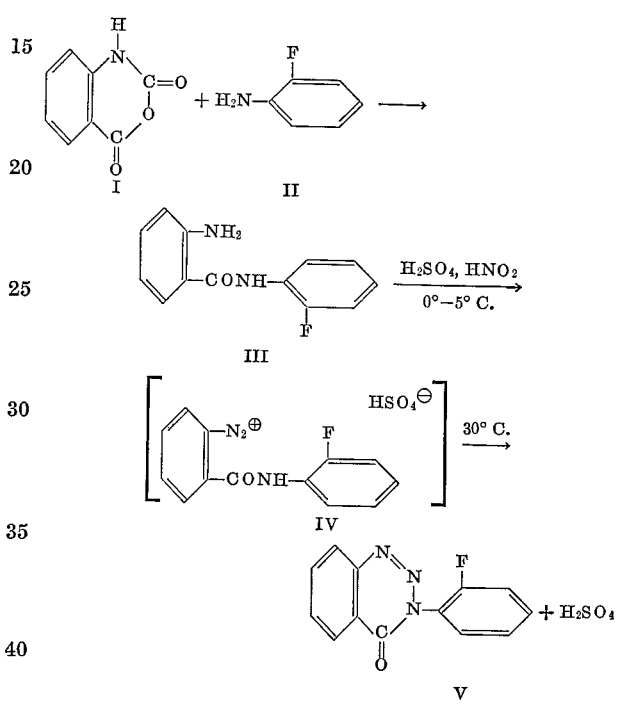

In the above reaction scheme, isatoic anhydride (I) is reacted with o-fluoraniline (II) at about 140° C. to about 200° C. Since it is desirable that the primary amine serve both as a reactant and as the solvent, an excess, such as at least 3 mols (per mole of isatoic anhydride) of the primary amine is desirably included in the reaction mixture. Greater amounts of the primary amine may also be used if desired. By this procedure, very weakly basic or hindered amines can still be caused to react with satisfactory yields. If an excess of o-fluoraniline is not used, autocondensation products of isatoic acid anhydride will be obtained as by-products.

The substituted anthranilamide compound (III) is then diazotized at a temperature of about 0–5° C. with a mixture of an alkali metal nitrite, such as sodium nitrite, and about equal parts of 3 N $H_2SO_4$ and a lower alkanol such as methanol, ethanol, n-propanol, and the like, preferably, n-propanol. The reaction product of the diazotization IV is cyclized without prior isolation by heating the resulting mixture to a temperature of about 20° C. to about 60° C. A temperature in the range from 20° C. to 30° C. is preferred. The compound 3-(2-fluorophenyl)-1,2,3-benzotriazin-4-one (V) is recovered by standard techniques.

In order to facilitate comprehension of the present invention, the following example is given. All temperatures are in degrees centigrade.

EXAMPLE I

3-(2-fluorophenyl)-1,2,3-benzotriazin-4-one

A suspension of 163 gms. (1 mol) of isatoic anhydride in 555 gms. (5 mols) of o-fluoroaniline is heated at 180° with agitation until $CO_2$ evolution has ceased. Excess o-fluoroaniline is distilled off in a vacuum and the residue is suspended in a mixture of 400 ml. ice cold 3 N $H_2SO_4$ and 400 ml. n-propanol and is slowly treated at 0–5° with a solution of 25 mgs. of $NaNO_2$ in 65 ml. water. After agitation for another half hour at this temperature, the system is diluted to double volume with water and then agitation continued at 30° for two additional hours. Thereafter, the prepared product is filtered with suction and thoroughly washed with water. 28 gms. of 3-(2-fluorophenyl)-1,2,3-benzotriazin-4-one is obtained after recrystallization from ethanol and benzene and is found to have a melting point of 142° C.

The pharmacological properties of 3-(2-fluorophenyl)-1,2,3-benzotriazin-4-one are as follows:

Toxicity: The toxicity of 3-(2-fluorophenyl)-1,2,3-benzotriazin-4-one, prepared in accordance with Example I, was determined in the following manner:

Increasing doses of this compound were administered intragastrically on an empty stomach to male mice of a weight between 17 and 21 gms. by means of a stomach tube. The doses were increased in a logarithmic manner. The mice so treated were observed for 7 days. Administration of 5000 mg./kg. of the compound 3-(2-fluorophenyl)-1,2,3-benzotriazin-4-one prepared according to Example I resulted in the death of less than half of the mice. Thus, the $LD_{50}$ of 3-(2-fluorophenyl)-1,2,3-benzotriazin-4-one in mice exceeds 5000 mg./kg.

Anticonvulsant activity: The anticonvulsant activity of a substance may be used as a criterion of its sedative action on the central nervous system. The compound of the instant invention, 3-(2-fluorophenyl)-1,2,3-benzotriazin-4-one, has a distinct anticonvulsant activity of the order of the commercially available anticonvulsants, e.g. trimethadione (Tridione). To determine the anticonvulsant activity of 3-(2-fluorophenyl)-1,2,3-benzotriazin-4-one, a dose to 200 mg./kg. of this substance was administered to mice. A similar group of mice was given 300 mg./kg. of Tridione while another group of mice was given a placebo composition. The test animals were male mice of 18–22 g. of weight. Each of the three groups of mice were then challenged with a 120 mg./kg. dosage of pentetrazol, administered subcutaneously. Anticonvulsant activity was determined by evaluating the extensor muscle convulsions in the mice. The results are tabulated in Table I which show that all the mice given pentetrazol following previous doses of trimethadione exhibited external muscle convulsions whereas the mice given 3-(2-fluorophenyl)-1,2,3-benzotriazin-4-one followed by pentetrazol were free of extensor motor convulsions. This establishes that 3-(2-fluorophenyl)-1,2,3-benzotriazin-4-one does, quite unexpectedly, possess central nervous system depressant activity.

TABLE I

| Substance | Mg./kg. p.o. | $LD_{50}$ (mouse) | Number of animals | Number of animals with extensor conv. |
|---|---|---|---|---|
| Traganth-mucilage | | | 12 | 12 |
| 3-(2-fluorophenyl)-3H-benzo-1,2,3-triazinone-(4) | 200 | 5,000 | 12 | 0 |
| Trimethadione | 300 | 2,000 | 12 | 12 |

3-(2-fluorophenyl)-1,2,3-benzotriazin-4-one has marked anoretic activity without central nervous system stimulant activity. It also has an exceptionally low toxicity. It is therefore useful as an anoretic agent in the mammalian body. For example, it is useful in treating obesity in dogs, cats, and human beings.

In use, this compound can be formulated with conventional pharmaceutical carriers to form such typical oral or rectal dosage units as tablets, capsules, solutions, suspensions, suppositories and the like. From about 300 mg. to about 600 mg. of this compound can be administered daily to the human adult in divided doses; smaller dosages can, of course, be employed for the young or debilitated elderly patients.

EXAMPLE II

Tablets containing the compound of this invention are formulated as follows:

| | 1000 tablets, gm. |
|---|---|
| 3-(2-fluorophenyl)-1,2,3-benzotriazin-4-one | 100 |
| Polyvinylpyrrolidone | 3 |
| Isopropanol | 30 |
| Corn starch | 18 |
| Avicel | 18 |
| Magnesium stearate | 1 |

The 3-(2-fluorophenyl)-1,2,3-benzotriazin-4-one is granulated with a 10% solution of polyvinylpyrrolidone in isopropanol. Corn starch, avicel and magnesium stearate are added to the dried granulation and the mixture is compressed into tablets.

What is claimed is:

1. A pharmaceutical composition comprising:
   (a) from about 300 to about 600 mg. of 3-(2-fluorophenyl)-1,2,3-benzotriazin-4-one and
   (b) pharmaceutical excipient material.

2. A process for producing anorexia which comprises administering the compound of claim 1 to a mammal in a dosage of about 300 mg. to about 600 mg. daily.

References Cited

UNITED STATES PATENTS

| 2,949,465 | 8/1960 | Lo | 260—248 |
| 3,120,523 | 2/1964 | Petersen et al. | 260—248 |
| 3,163,646 | 12/1964 | Herlinger et al. | 260—248 |
| 3,202,658 | 8/1965 | Lorenz et al. | 260—248 |

ALBERT T. MEYERS, Primary Examiner

S. J. FRIEDMAN, Assistant Examiner